March 22, 1966 E. F. BORRO, SR., ETAL 3,241,391
INTEGRAL MOLDED COMPOSITE ARTICLES AND PROCESS
FOR PRODUCING THEM
Filed Jan. 23, 1962
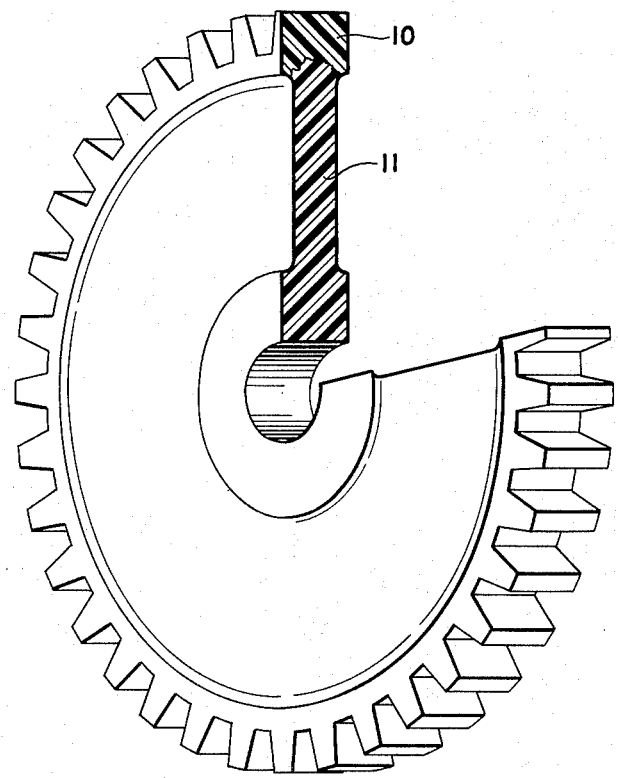
INVENTORS
EDWARD F. BORRO, SR.
JOHN E. EMMETT
WILLIAM R. WINDOVER
BY Robert M Phipps
ATTORNEY

United States Patent Office 3,241,391
Patented Mar. 22, 1966

3,241,391
INTEGRAL MOLDED COMPOSITE ARTICLES AND PROCESS FOR PRODUCING THEM
Edward F. Borro, Sr., Williamsville, N.Y., John E. Emmett, Farmington, Mich., and William R. Windover, North Tonawanda, N.Y., assignors to Hooker Chemical Corporation, Niagara Falls, N.Y., a corporation of New York
Filed Jan. 23, 1962, Ser. No. 168,597
13 Claims. (Cl. 74—445)

This invention is concerned with composite molded articles in which different portions are required to possess different physical properties.

More specifically, the present invention relates to integral, molded composite articles, comprising essentially synthetic resin binder and filler particles, which in an inner peripheral or core portion have a high degree of strength and dimensional stability and in an outer peripheral portion or rim have a high degree of toughness, resilience, and wear resistance, and to the production of such articles.

In the production of driving and driven members such as gears, sprockets, wheels, pulleys, and the like, by molding mixtures of synthetic resin binders and filler particles, the achieving of satisfactory physical properties has hitherto been impossible in many cases. For example, when molding a gear requiring high strength and a high degree of dimensional stability from a thermosetting synthetic resin and a particulate filler, it has been found that, although the desired strength and dimensional stability may be obtained, the gear teeth wear rapidly and are often broken because of their excessive rigidity. On the other hand, thermosetting synthetic resin-filler compositions which impart the necessary resilience and wear resistance to the teeth of gears molded therefrom are not suitable for the core or hub portions of the gears, since they are insufficiently strong and are subject to dimensional change and warping.

An attempt to solve the above-mentioned problem by molding a rim of thermosetting resin-filler composition having the toughness, resilience, and wear resistance desired for the gear teeth and then forming the hub in a second molding operation using a thermosetting resin-filler mixture having the required high strength and dimensional stability was unsuccessful.

Broadly, therefore, it is an object of the present invention to produce integral, molded composite articles of synthetic resin-filler compositions which have different characteristics and physical properties in different portions of said articles.

Less broadly, it is an object of the invention to produce from synthetic resin-filler compositions integral, molded driving and driven members such as gears, sprockets, wheels, pulleys, and the like, in which the inner peripheral portions, i.e., the hubs or cores, of the molded members possess desirable physical properties which are different from those of the outer peripheral or rim portions of the members.

More specifically, it is an object of the invention to produce integral, composite molded articles of the character described having tough, resilient, and wear resistant outer peripheral portions and strong, dimensionally stable, warp resistant inner peripheral portions.

A further object of the invention is to provide a molding process for producing integral, molded, composite, resinoid articles of the character described.

The defects of the prior molded resinoid articles have been overcome and the foregoing objects have been achieved by a process which involves molding the desired article in such a manner that the outer peripheral portion thereof is formed from a resin-filler mixture that will impart to that portion the required properties, while the inner peripheral or hub portion of the article is formed from a different resin-filler mixture that will impart to the hub portion the properties required therein. The process also is characterized by the consolidation of the rim or outer peripheral portion of the article by pressure exerted through the resin-filler mixture that comprises the hub portion of the article. Thus, a molded composite article is produced which has the desired differences in physical properties and characteristics in its inner and outer peripheral portions, while at the same time, the article is an integral one so that no delamination problems exist.

The invention is illustrated in a preferred embodiment in the accompanying drawing by a cutaway sectional perspective view of a gear wherein the toothed outer peripheral portion 10 is comprised of a resin-filler mixture and the inner peripheral or hub portion 11 is formed of a different resin-filler mixture, the compositions of each portion being cohesive with the other portions.

It will be understood that within the principles set forth herein the intended use of the composite articles produced in accordance with the invention will influence the choice of the resin-filler compositions used in making them, and that a wide choice of such compositions is available. However, among the formulations discussed below will be found some which are suitable for most purposes.

RESINOUS COMPONENTS

In forming both the inner and outer peripheral portions of composite molded articles according to the present invention, thermosetting resins are preferably employed. As exemplary of thermosetting resins that will be satisfactory under suitable conditions are: phenolic resins, e.g., resins produced by the condensation of phenol with formaldehyde in either a one-stage or a two-stage process, and resins produced by the condensation of phenol with furfural or mixtures of furfural and formaldehyde; aminoplast resins, e.g., urea-formaldehyde and melamine-formaldehyde resins; epoxy resins; polyester resins and suitable mixtures of two or more resins of the classes specified. Phenol-formaldehyde resins are particularly useful and such resins may have a phenol-to-formaldehyde molar ratio of from about 1:0.9 to 1:2, although for use in producing gears in accordance with the specific examples hereinafter set forth, resins having a phenol-to-formaldehyde molar ratio of from about 1:1.2 to 1:1.6 are preferred. Mixtures of one-stage and two-stage phenol-formaldehyde resins may be used if desired.

FILLER MATERIALS

Since it is well known that the properties of molded resin-filler compositions are determined in substantial degree by the type of filler material used, as well as by the type of resin and and other factors, it will be understood that the choice of fillers in producing molded articles in accordance with the present invention is important.

Nevertheless, depending upon the particular characteristics desired in the several portions of the articles, a wide choice of filler materials is available. For example, in molded articles such as gears and sprockets, the toothed, outer peripheral portion or rim is required to be tough, resilient, and wear resistant, while the hub or inner peripheral portion preferably is strong and rigid, and has a high degree of dimensional stability and resistance to warping. Consequently, for the outer peripheral portion, a filler or fillers selected from such materials as nylon, rayon, Orlon, Dacron and Teflon, the last three being trademarks of E. I. du Pont de Nemours & Co. for polyacrylic, polyester and polytetrafluoroethylene fibers, respectively, which will impart resiliency and toughness to the resin-filler composition will preferably be used either as flock, cut roving, or in powder form. However, other thermoplastic fillers such, for example, as polyethylene, polypropylene, polystyrene, styrene copolymers, vinyl resins, acrylonitrile polymers and copolymers, polysiloxane resins, polycarbonate resins and polyacrylate resins may be used as fillers, either in admixture with those previously mentioned or alone when they impart desired properties. Thus, polyethylene and polypropylene provide a certain amount of self-lubrication to a molded article containing them. With a filler or fillers of the kinds listed above, there may also, if desired, be mixed other fillers such as graphite or moybdenum disulfide, which will impart self-lubricating properties to the composition.

To provide for the inner peripheral portion or hub of the molded gear or sprocket the strength, high dimensional stability and resistance to warping which is desired, an inorganic filler is preferably employed. Among the large number of such fillers, glass and asbestos fibers, either as separate fibers or as cut roving, have been found particularly useful, since shrinkage of the composition during curing is minimized with such fillers. In some cases other fibrous materials such as wood flour, paper flock, cotton flock and sisal fibers may be used, in whole or in part, for the filler in the hub portion and inorganic particulate fillers such as silica, granular glass, clay, calcium carbonate, and the like, may be employed alone or as additions when their use would not be detrimental.

RESIN-FILLER FORMULATION

In formulating resin-filler mixtures for producing integral, molded, composite articles in accordance with the present invention, the choice of the resin or resins and fillers used will be determined by the type of article, the conditions of use, and the particular properties and characteristics desired. It is also well known that the relative proportions of resin and filler may be varied to achieve desired properties. A considerable variation in proportions may be used.

In preparing resin-filler mixtures for molding gears of the type described in the specific examples herein, the compositions used for the toothed, outer peripheral portion may comprise about forty percent to seventy-two percent phenolic resin, about twenty-nine percent to fifty-three percent nylon or similar organic fiber filler, and, if desired, up to about twenty percent graphite or up to about ten percent molybdenum disulfide for lubrication. Preferably, the phenolic resin will comprise about fifty percent to sixty percent of the composition, the fibrous filler will constitute about thirty-five percent to forty-five percent thereof, and the graphite or molybdenum disulfide, when used, will not exceed ten percent or five percent respectively. There may also be used small amounts, of the order of two percent to three percent each, of a dye and of a suitable mold release lubricant.

The compositions used for the hub or inner peripheral portion of the gear may comprise about twenty-six percent to forty-six percent phenolic resin, about twenty-four percent to seventy percent glass or asbestos fiber filler, and up to about forty-five percent of a granular, powdered or other fibrous filler. In preferred compositions, the phenolic resin will comprise about thirty percent to forty percent of the composition, fibrous inorganic filler will constitute about thirty percent to sixty percent thereof, and the other filler will comprise zero percent to about forty percent of the composition. In addition, the composition may include small amounts, of the order of two percent to three percent each, of a suitable dye and of a suitable mold release lubricant.

While it is not necessary to employ the same type of resin in the composition used to form the outer peripheral portion of a molded article as is used in the composition forming the hub of the said article, it is necessary that the resins used in the two portions have a high degree of cohesion so that the two portions will not separate in use. It is also necessary in choosing the fillers to be used to select ones to which the resins used will strongly adhere, both during the molding operation and thereafter. Obviously, lack of adherence between the filler and resin reduces the strength of the molded article. Subject to these limitations and the other factors mentioned above, the resin-filler compositions used in carrying out the invention may vary widely.

The actual mixing of the several constituents may be carried out in conventional or other known manner, and the mixes may be provided for use in either loose powder or pellet form.

MOLDING CONDITIONS

The specific molding conditions employed in carrying out the present invention will be governed by the specific construction of the molding apparatus, the geometrical configuration and size of the article being molded, the conditions under which the article will be used, and the characteristics of the resin-filler compositions employed. Thus, the molding temperature, molding pressure, preheating time and curing time are subject to wide variance, and will be determined in accordance with the well recognized criteria of those skilled in the art.

MOLDING PROCESS

In forming integral, molded, composite articles according to the present invention, the molding operation is carried out in a single step, although the two, different, resin-filler compositions are introduced into the mold separately. The preferred method is to fill the outer periphery of a hot mold cavity with the resin-filler composition to be used in the outer periphery of the gear, sprocket, pulley, wheel, or the like, the composition being in loose or granular form; close the mold, whereby the heat of the mold softens the resin of the molding composition so that it will flow under pressure; preheat, exteriorly of the mold cavity, the resin-filler composition to be used in the hub or inner peripheral portion of the article; and, then, introduce the heated composition under pressure by transfer molding into the central portion of the heated mold cavity. The pressure employed and the amount of resin-filled composition introduced in the central portion of the mold are such that the heat-softened resin-filler mixture around the outer periphery of the mold is consolidated and forced to conform to the mold contours. The molded article may be cured in the mold or may be removed and the cure completed in a heated oven.

The invention will be illustrated further by the examples which follow. In these examples all parts are stated as parts by weight unless otherwise indicated. The relative amounts of molding compounds used in the outer peripheral portion of the molded article and the inner peripheral portion, will, of course, depend on the nature of the compounds, i.e., their density, etc., and also upon the desired use of the article. In many cases, only a thin rim or outer peripheral portion is needed, while, in other instances, a relatively thick rim portion is required.

Example 1

In molding a circular gear having an outer diameter of about 5.75 inches and a thickness of about 0.5 inch, a mold heated to about one hundred and sixty degrees centigrade was used and the outer periphery of the mold cavity was filled with fifty parts of a mixture consisting of fifty-two percent two-stage phenol-formaldehyde resin, forty-three percent nylon flock filler, two percent nigrosine dye, and three percent stearate mold lubricant. The mold was then closed, the resin of the mixture being softened by the heat of the mold. There was then introduced by transfer molding into the central portion of the mold cavity, two hundred and thirty-five parts of a resin-filler molding composition consisting of thirty-three percent one-stage phenol-formaldehyde resin, forty-eight percent glass fiber filler in cut roving form, seventeen percent of a clay-like, natural mineral silicate filler, and two percent stearate mold lubricant. The latter composition consolidated the heat-softened molding compound containing the nylon filler and by hydrostatic pressure forced it into the contours of the mold periphery, while, at the same time, thoroughly bonding together the two portions of the gear. The gear was kept in the mold at one hundred and seventy degrees centigrade for two and one-half minutes to cure the resins and then was removed. The integral, molded, composite gear obtained required no finishing other than grinding off the gate around the hub. Under test, the gear demonstrated an excellent resistance to wear and was strong and dimensionally stable.

In the following examples, the procedure was, as mentioned, substantially the same as that set forth in Example 1. As a result of changes in the resins and resin-filler combinations, the molding temperatures and times varied slightly. In all cases, however, the molding temperature was within a few degrees of one hundred and seventy degrees centigrade and the molding time was in the range of about one to three minutes.

Example 2

A similar gear was molded by the same procedure as set forth in Example 1, except that the molding compound used for the inner periphery or hub of the gear and introduced by transfer molding consisted of thirty-three percent one-stage phenol-formaldehyde resin, thirty percent glass fiber filler, thirty-five percent natural mineral silicate filler, and two percent stearate mold lubricant.

Example 3

A similar gear was produced using the procedure of Example 1, except that the molding compound used for the toothed outer portion of the gear consisted of forty-eight percent two-stage phenol-formaldehyde resin, thirty-eight percent nylon flock, ten percent graphite powder, two percent nigrosine dye, and two percent stearate mold lubricant; and the molding composition employed for the inner hub portion of the gear consisted of thirty-three percent one-stage phenol-formaldehyde resin, thirty percent glass fiber filler in cut roving form, thirty-five percent natural mineral silicate filler, and two percent stearate mold lubricant.

Example 4

A similar gear was produced by the procedure set forth in Example 1, except that the molding composition employed for the outer, toothed portion of the gear consisted of fifty-nine percent one-stage phenol-formaldehyde resin, thirty-seven percent nylon flock filler, two percent nigrosine dye, and two percent stearate mold lubricant.

Example 5

A similar gear was produced following the procedure of Example 1, except that the outer peripheral portion of the gear was formed from forty parts of a molding compound consisting of fifty-four percent two-stage phenol-formaldehyde resin, forty-two percent nylon flock filler, two percent nigrosine dye, and two percent stearate mold lubricant; and the hub portion of the gear was formed from two hundred and ten parts of a molding compound consisting of thirty-eight percent two-stage phenol-formaldehyde resin, fifty-eight percent asbestos fiber filler, two percent nigrosine dye, and two percent stearate mold lubricant.

Example 6

The procedure set forth in Example 1 was used in producing a gear, but the outer peripheral, toothed portion of the gear was formed from forty parts of a molding compound consisting of fifty-nine percent one-stage phenol-formaldehyde resin, thirty-seven percent nylon flock filler, two percent nigrosine dye, and two percent stearate mold lubricant, while the molding compound used in forming the hub portion of the gear was the same as that used in Example 5.

Example 7

Example 2 was repeated, but with the substitution for the resin-filler molding compound used in Examples 1 and 2 in forming the outer peripheral portion of the gear of a molding compound consisting of fifty-nine percent one-stage phenol-formaldehyde resin, thirty-seven percent nylon flock filler, two percent nigrosine dye, and two percent stearate mold lubricant.

Example 8

Example 3 was repeated, but with the substitution for the resinoid molding compound used therein in forming the outer, toothed portion of the gear of a heat-setting molding compound consisting of fifty-nine percent one-stage phenol-formaldehyde resin, thirty-seven percent nylon flock filler, two percent nigrosine dye, and two percent stearate mold lubricant.

The gears produced in Examples 2 to 8, inclusive, were found on testing to have excellent resistance to wear and abrasion and to be strong, dimensionally stable, and resistant to warping. In an extreme test involving immersing the gear in a bath of hot oil, maintained at two hundred and fifty degrees Fahrenheit, for four hours and then removing it immediately to a chest held at minus twenty degrees Fahrenheit, where it was kept for two hours, none of the gears showed signs of cracking or warping. This shows clearly the excellent dimensional stability of the gears.

In Example 3, the molding compound used in forming the outer, toothed portion of the gear contained graphite powder to impart a self-lubricating characteristic to the gear teeth. As indicated above, molybdenum disulfide powder may also be included in molding compounds for the same purpose. Extensive experimentation has shown that graphite powder and molybdenum disulfide powder may be used in varying amounts up to twenty percent in the case of graphite and up to ten percent in the case of molybdenum disulfide, though the maximum amounts mentioned are rarely necessary, where self-lubrication is an important factor. The resulting gears have been satisfactory from the standpoint of being adequately self-lubricating for the intended purposes, while at the same time they have good wear and abrasion resistance, and are quite strong and dimensionally stable.

It will be apparent to those skilled in the art that, depending upon the special properties required for the intended use, other fillers and resins, including those enumerated hereinabove may be substituted for those employed in the foregoing examples, and that these may be mixed in any advantageous way. It will also be apparent that an integral, molded, composite article can be formed using a three-step procedure, wherein a selected resin-filler composition is employed to form the outer periphery thereof, a different resin-filler composition is employed to form the central portion thereof, and a third type of resin-filler composition is employed to form an intermediate portion of the composite molded article. Indeed, if desired, an integral, molded, composite article having more than three different types of resin-filler compositions to impart varying physical properties to various portions of the article may be produced.

While the preceding examples deal with the production of circular gears, it should be understood that the present invention in its broadest aspect is not limited to any particular configuration, size, or use of the molded, composite article, but rather is subject to wide variance both as to specific configuration, size, and the resinous materials and filler materials which can be employed to impart these desired physical characteristics to the molded, composite article formed in accordance with this invention. Thus, it will be realized that the invention in its broadest aspects is also not limited to the specific materials, temperature and pressure conditions, and molding sequences set forth herein.

All percentages referred to in the foregoing specification and the appended claims are percentages by weight.

We claim:

1. An integral, molded, composite article which comprises at least two portions having different characteristics and physical properties, said different portions being concentrically disposed, each of said portions comprising a filler dispersed and held in a resin binder with the fillers in the different portions being at least in part different and the resins in the different portions being cohesive.

2. An integral, molded composite article as set forth in claim 1 in which said resin binders are thermosetting resins.

3. An integral, molded, composite article as set forth in claim 1 in which, by comparison, one with another, the outer one of said portions is characterized by superior toughness and wear resistance, and the inner one of said portions is characterized by superior strength and dimensional stability.

4. An integral, molded, composite article as set forth in claim 3 in which the outer one of said portions comprises a substantial amount of a fibrous, organic filler, and the inner one of said portions comprises a substantial amount of a fibrous, inorganic filler.

5. An integral, molded, composite article as set forth in claim 3 in which the resin binders in said different portions are the same.

6. An integral, molded, composite article as set forth in claim 3 in which the resin binders in said different portions are different.

7. An integral, molded, composite article as set forth in claim 4 in which the resin binders in said different portions are the same.

8. An integral, molded, composite article as set forth in claim 4 in which the resin binders in said different portions are different.

9. An integral, molded, composite article as set forth in claim 4 in which the resin binder in at least one of said portions is a phenolic resin.

10. An integral, molded gear which comprises a toothed outer peripheral portion and an inner peripheral portion, including a hub, said portions being concentric, said toothed portion comprising a fibrous, organic filler dispersed and held in a resin binder, and said inner peripheral portion comprising a fibrous, inorganic filler dispersed and held in a resin binder, said toothed portion being characterized, in comparison with said inner peripheral portion, by superior toughness and wear resistance, and said inner peripheral portion being characterized, in comparison with said toothed portion, by superior strength and dimensional stability, and the resins in the different portions being cohesive.

11. An integral, molded gear as set forth in claim 10 in which said resins are phenolic resins.

12. An integral, molded gear as set forth in claim 10 in which the fibrous filler in said toothed portion is nylon, the fibrous filler in said inner peripheral portion is asbestos, and the resin binders in said portions are phenol-formaldehyde resins.

13. An integral, molded gear as set forth in claim 10 in which the fibrous filler in said toothed portion is nylon, the fibrous filler in said inner peripheral portion is glass fiber, and the resin binders in said portions are phenol-formaldehyde resins.

References Cited by the Examiner

UNITED STATES PATENTS

| | | | |
|---|---|---|---|
| 312,780 | 2/1885 | Wilcox | 74—443 |
| 680,654 | 8/1901 | Comber | 74—443 |
| 1,477,025 | 12/1923 | Atwood | 18—59 |
| 1,940,359 | 12/1933 | Lytle | 74—445 |
| 2,895,175 | 7/1959 | Reuter et al. | 18—59 |

OTHER REFERENCES

Machine Design, volume 33, No. 3, February 1961.

DON A. WAITE, *Primary Examiner.*

WILLIAM J. STEPHENSON, *Examiner.*